United States Patent

[11] 3,602,715

[72] Inventor David T. McDivitt
 Lancaster, Pa.
[21] Appl. No. 811,969
[22] Filed Apr. 1, 1969
[45] Patented Aug. 31, 1971
[73] Assignee Kerr Glass Manufacturing Corporation
 Los Angeles, Calif.

[54] APPARATUS FOR MEASURING WALL
 THICKNESS OF HOLLOW ARTICLES UTILIZING
 RADIOACTIVE RADIATION ABSORPTION
 4 Claims, 2 Drawing Figs.
[52] U.S. Cl. .................................................. 250/83.3,
 209/111.5, 250/71.5
[51] Int. Cl. .................................................. G01t 1/20
[50] Field of Search .................................... 250/71.5,
 83.3 D; 209/111.5

[56] References Cited
 UNITED STATES PATENTS
2,964,630 12/1960 Bosch .......................... 250/83.3

3,348,049 10/1967 Stacey ......................... 250/83.3
3,426,196 2/1969 O'Shea et al. ................ 250/83.3

Primary Examiner—Archie R. Borchelt
Attorney—Fitch, Even, Tabin and Fuedeka

ABSTRACT: An apparatus for measuring the wall thickness of hollow articles wherein a scintillometer, comprising a scintillation crystal, a photomultiplier tube, a pulse generator, and an integrator, detects the radiation transmitted through a hollow article wall and produces an analog voltage which in turn is used to give a direct readout of the measurement of an article wall thickness when the voltage reaches a predetermined value. The apparatus, utilizing the output voltage from the scintillometer, can also trigger a warning indicator at a predetermined level prior to the aforesaid predetermined level at which the wall thickness is measured, indicate the vertical position of the point at which the smallest wall thickness is measured, and plot the wall thickness of a hollow article being checked.

INVENTOR
DAVID T. McDIVITT

3,602,715

APPARATUS FOR MEASURING WALL THICKNESS OF HOLLOW ARTICLES UTILIZING RADIOACTIVE RADIATION ABSORPTION

BACKGROUND OF THE INVENTION

1. Field of the Invention

The invention relates to an apparatus for checking the wall thickness of a hollow article. More particularly, this invention is concerned with an apparatus for measuring the wall thickness of hollow articles, e.g. glass bottles and containers, utilizing radiation absorption.

2. Description of the Prior Art

The prior art radioactive radiation-type devices for determining the wall thickness of hollow articles, such as the device set forth in U.S. Pat. No. 2,501,174, do not really give a direct readout of the measurement of the article wall thickness but merely an indication of the article wall thickness by merely detecting the radiation which was transmitted through the article wall and giving a readout on an analog meter. Even through this patented device does give an indication of the wall thickness, it has to be operated manually.

Another device for determining the wall thickness of hollow articles is the one set forth in U.S. Pat. No. 3,426,196. Again, this patented device does not actually give a direct readout of the measurement of the article wall thickness, but only indicates when the wall thickness is below a predetermined value. The apparatus of the present invention gives a direct digital readout in mils of the thinnest bottle wall thickness measured below a predetermined point. Even for the patented device to achieve the above stated indication, a statistician must take a statistical sampling of many hollow articles whose thickness is to be checked in order to calibrate the device. The apparatus of the present invention needs no such elaborate calibration. After the patented device has indicated that a hollow article has a wall thickness below a predetermined level, the only means for getting a direct measurement of the wall thickness is to physically section and measure such wall thickness. Such sectioning and measuring of the wall thickness is quite laborious and time consuming. Hence, this is a very inefficient method of measuring the wall thickness of hollow articles. It also is very uneconomical since the cost of labor is directly proportional to the skill involved. The skill necessary to section and particularly physically measure the wall thickness is much greater than the skill needed to read a direct readout giving the measurement in simple digits.

Consequently, this invention will eliminate the need for manually sectioning and measuring of hollow articles to determine their wall thickness with the resultant effects of decreased labor costs, increased efficiency, and increased reliability and predictability since there is less chance for human error. The invention will also eliminate the need for any elaborate and time consuming calibration, and hence, is more simple to operate.

SUMMARY OF THE INVENTION

This invention gives a direct readout of the measurement of the wall thickness of a hollow article. This is accomplished by having a scintillometer, composed of a scintillation crystal, a photomultiplier tube, a pulse generator, and an integrator, detect the radiation transmitted through the article wall from a radioactive radiation source, convert the detected radiation into pulses of energy and then convert said pulses into an output analog voltage. The apparatus of the invention rotates the hollow article as the radiation source and the radiation-responsive detector move from the upper to the lower portions of the hollow article. This provides a spiral scan of the article wall being measured. The output voltage from the scintillometer is then fed through a logarithmic detector and an inverting span amplifier and is thereby converted into a signal voltage which is directly proportional to the article wall thickness at a predetermined voltage per unit of article wall thickness.

At the start of the scanning cycle, a predetermined wall thickness in terms of a predetermined voltage per unit of article wall thickness is fed through a memory circuit to a readout and to a comparator. Whenever the signal voltage becomes less than the reference voltage initially fed into the comparator, a reject indicator is activated as is a feedback circuit which allows a new reference voltage to be fed through the memory circuit to the readout and to the comparator. The readout now has the measurement of the article wall thickness showing thereon. This process of sample, hold, and readout is repeated throughout the scanning cycle whenever the incoming signal voltage to the comparator goes beyond the comparator's reference voltage. Consequently, the final reading on the readout is the smallest wall thickness.

The signal voltage from the inverting span amplifier is also fed to a warning comparator, which has a reference voltage set thereon at a predetermined voltage level above that voltage which is originally fed into the memory circuit and the first comparator. Whenever the signal voltage into the warning comparator goes below its predetermined reference voltage, a warning indicator is activated.

A potentiometer, which is mechanically linked to the radiation source and radiation-responsive detector, is set at a high voltage level at the beginning of the scanning cycle and moves to a low voltage at the end of the scanning cycle. As the bottle is scanned from top to bottom, the voltage from the potentiometer is fed directly to one leg of a vertical position comparator and through a second memory circuit to the second and reference leg of the comparator. Whenever a thin spot below the predetermined minimum wall thickness is found in the article wall, the memory circuit is activated and a new reference voltage from the potentiometer is fed to the comparator reference leg. This is continued and repeated throughout the scan of the hollow article. After the bottle has been scanned and the radiation source and radiation-responsive detector are returning to their topmost position, the direct feed from the potentiometer into the comparator is now moving from its low to high voltage. Whenever the voltage being fed directly from the potentiometer into the comparator goes beyond the reference voltage fed from the memory circuit, the carriage is stopped, thus indicating the vertical position of the point of smallest wall thickness of said hollow article.

One additional feature of this invention is that by utilizing the signal voltage output from the inverting span amplifier and the voltage from the potentiometer and feeding said voltages to an XY-plotter, the wall thickness of the hollow articles being checked can be plotted. A series of bottles being checked can also have their wall thickness plotted.

DESCRIPTION OF THE PREFERRED EMBODIMENT

Figure 1:
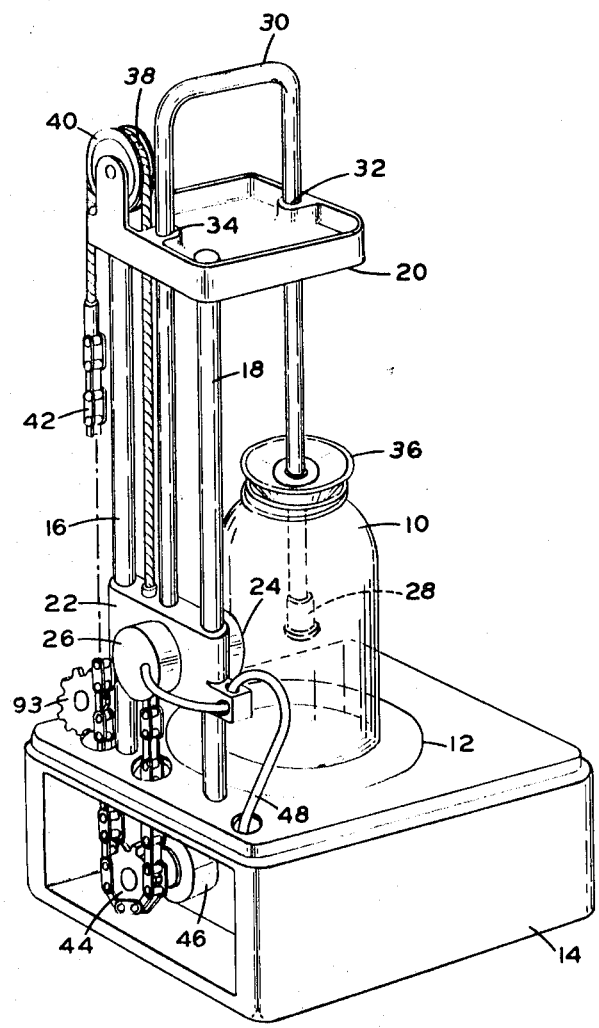
FIG. 1 is a perspective view of one form of apparatus of this invention.

As shown in FIG. 1 of the drawings, a glass bottle 10 which is to have its wall thickness measured rests on a turntable 12. Turntable 12 is connected to and driven by an electric motor (not shown) which is located within a housing 14. Said housing contains electronic circuitry for the operation of the apparatus. Supports 16 and 18 extend upwardly from housing 14 and have secured thereto a bracket 20.

Slidably attached to supports 16 and 18 and arranged for movement therealong is a second housing 22 in which a scintillation crystal 24 and a photomultiplier tube 26 is positioned. A beta radiation source 28 is maintained in a fixed spatial relationship with the scintillation crystal 24 by mounting said source on one end of a rod 30 which extends downwardly through a guide hole 32 in bracket 20. The opposite end of rod 30 extends downwardly through a second guide hole 34 in bracket 20 and is secured to said second housing 22 which moves along supports 16 and 18. A conical shield 36 is movably mounted on rod 30 adjacent to source 28 and arranged to rest on the bottle 10 (as shown) during operation of the apparatus, but slides downwardly over source 28 to shield it when the source 28 is withdrawn upward and out of the bottle 10. Beta radiation source 28 and scintillation crystal 24 and photomultiplier tube 26 may be raised and lowered by a suitable drive arrangement shown in FIG. 1 as a cable loop 38 attached to said second housing 22 and supported by a pulley 40 mounted on bracket 20. A portion of the loop is formed by a chain 42 which meshes with the teeth on gear 44, driven by a reversible motor 46. This loop, when driven by motor 46 raises and lowers said second housing 22 along supports 16 and 18 which also raises and lowers the beta radiation source 28 into and out of the bottle 10. Movement of said source and said scintillation crystal and said photomultiplier tube when turntable 12 is rotated performs a spiral scan of the wall of bottle 10. Cable 48 transmits varying energy voltage pulses from the photomultiplier tube 26 to the electronic circuitry located within housing 14.

Figure 2:
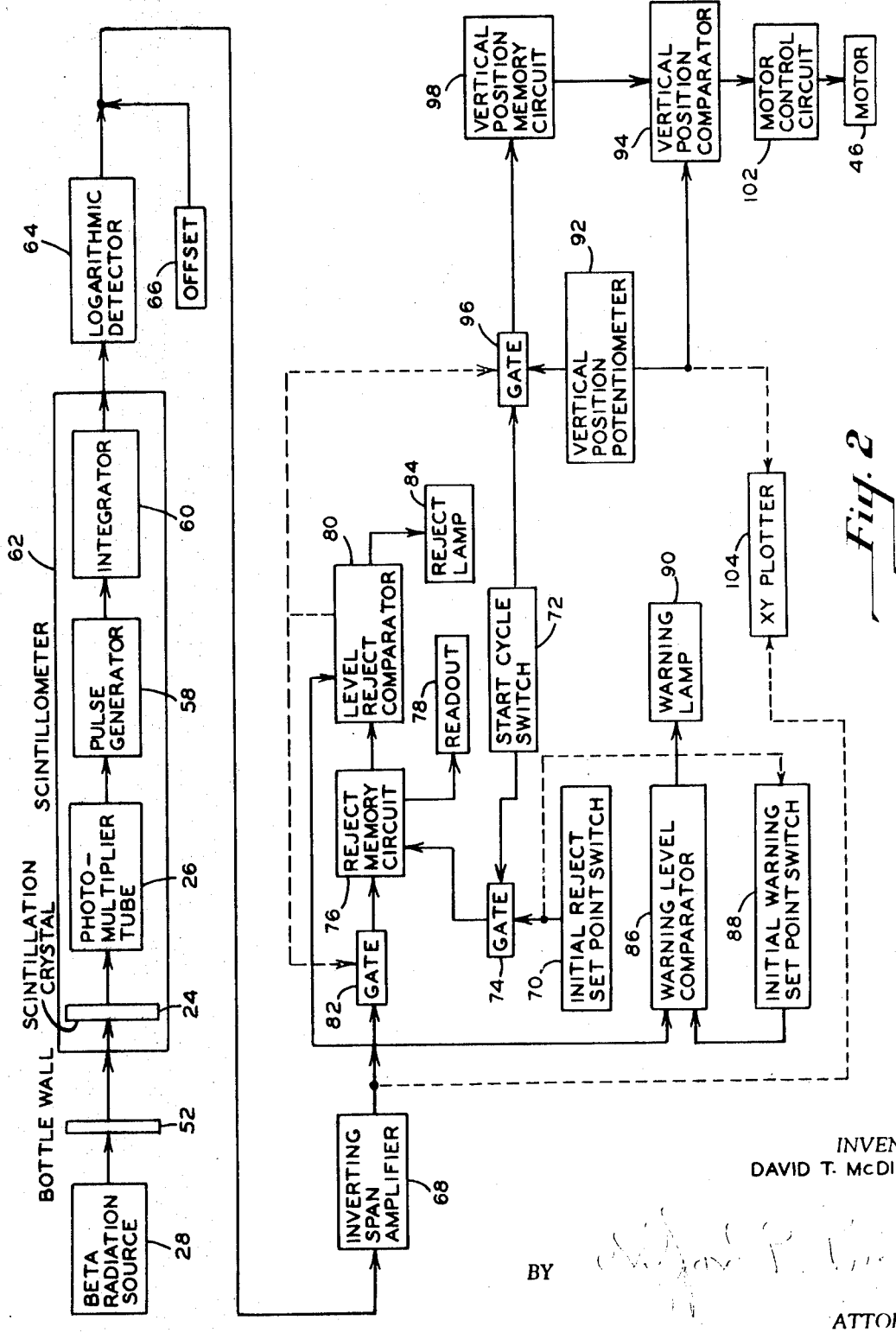
FIG. 2 is a block diagram schematically showing the electronic circuitry of the present invention.

Referring to the block diagram shown in FIG. 2, beta particles are emitted from beta radiation source 28 and are directed toward a specimen such as the bottle wall 52 of the bottle 10, the thickness of which is desired to be measured. That portion of the beta particles which pass through said bottle wall 52 impinge upon the conventional scintillation crystal 24. Scintillation crystal 24 converts the impinging radiation energy in the form of beta particles into light pulses. These light pulses are then transmitted to and detected by a conventional photomultiplier tube 26. The photomultiplier tube then converts the detected light pulses into varying energy voltage pulses and transmits said varying energy voltage pulses to a conventional pulse generator 58. The scintillation crystal 24 and the photomultiplier tube 26 constitutes the radiation-responsive means which produces a varying energy voltage pulse output in which the number of pulses is dependent upon the level of radiation received from the beta radiation source 28. Pulse generator 58 then standardizes the incoming varying energy voltage pulses to a constant energy level by generating pulses of constant amplitude when a predetermined voltage threshold level is exceeded. The constant energy level voltage pulses generated by said pulse generator 58 are then fed into a conventional integrator 60. Like the conventional electronic integrator, integrator 60 performs a summing operation. Integrator 60 sums the incoming constant energy level voltage pulses from pulse generator 58 and produces an output analog voltage signal. Said analog voltage signal is inversely logarithmically related to the wall thickness of bottle wall 52.

Scintillometer 62 is a conventional device commonly used for detecting and registering individual scintillations in radioactive emissions and in converting said scintillations into a meaningful electrical output. The parameters of beta radiation source 28 and scintillometer 62 of this invention are such that a bottle wall of glass in the range of 0.020 to 0.125 inch can be accurately measured. These parameters, of course, may be adjusted to accurately measure different ranges of glass bottle wall thicknesses.

Logarithmic detector 64 is a conventional semiconductor logarithmic detecting device for detecting and converting logarithmic relationships into linear relationships. Said logarithmic detector 64 detects and converts the analog voltage output of said integrator 60 which voltage is inversely logarithmically related to the wall thickness of bottle wall 52 into a voltage which is inversely linearly related to the thickness of bottle wall 52. At this point a constant offset voltage from offset 66 is fed to the voltage output from logarithmic detector 64. This constant offset voltage is merely introduced into the voltage signal at this point to reduce the constant voltage value which has been introduced into the voltage signal up to this point. This increases the accuracy of the apparatus when measuring wall thicknesses such as bottle wall 52. This corrected voltage signal is then fed into inverting span amplifier 68. Said inverting span amplifier 68 performs the function of a conventional inverter by inverting the input voltage which is inversely linearly related to the wall thickness of bottle wall 52, so that the voltage output is directly proportional to the wall thickness of bottle wall 52. Said amplifier 68 also performs the conventional amplification of the incoming voltage so that the output voltage is expanded to a predetermined voltage per mil of thickness of the bottle wall. The output voltage from said inverting span amplifier 68 is the signal voltage which is used to activate the remaining conventional electronic circuitry of this invention when measuring bottle wall thicknesses. This said signal voltage is linear and directly proportional to the wall thickness of bottle wall 52 and is expanded to a voltage of 10 millivolts per mil of bottle wall thickness.

Before the scanning cycle is started, the initial reject set point switch 70, a thumb switch, is set at that bottle wall thickness below which the bottle wall is too thin and will be rejected. This bottle wall thickness is set on said reject set point switch 70 directly in terms of mils. As the signal from inverting span amplifier 68 represents one mil of bottle wall thickness by 10 millivolts, so too, each mil of bottle wall thickness set on reject set point switch 70 is represented by 10 millivolts.

When start cycle switch 72 is pushed, gate 74, a conventional electronic series switching arrangement, is closed until said start cycle switch 72 is released. This allows the voltage which represents the bottle wall thickness set on said reject set point switch 70 in terms of mils to be fed to the reject memory circuit 76. Said reject memory circuit 76 is a conventional electronic memory or holding circuit which holds its voltage output at a fixed level until it is triggered to change state and thus hold the new voltage at its output. The voltage representing the bottle wall thickness at 10 millivolts per mil, which is fed to said reject memory circuit 76, is fed by said memory circuit 76 to readout 78 and to level reject comparator 80. Readout 78 is a conventional digital voltmeter calibrated to give its readout in digits representing mils of bottle wall thickness. Hence, whatever bottle wall thickness in terms of mils has been set on said reject set point switch 70, this will initially be shown in digits on readout 78.

Level reject comparator 80 is a conventional electronic voltage comparator having as its reference the voltage output of reject memory circuit 76. At the start of the scanning cycle, the initial voltage reference out of said reject memory circuit 76 is that voltage which has been fed to said reject memory circuit 76 through gate 74. As the scanning cycle starts, the signal voltage from said inverting span amplifier 68 is fed to said level reject comparator 80, to gate 82, and also to the warning level comparator 86. This signal voltage which is linearly and directly proportional to the wall thickness of bottle wall 52 is fed to the level reject comparator 80 during the entire downward scanning of said bottle wall 52. If at any point in this downward scan of said bottle wall 52, the signal voltage drops below the reference voltage from said reject memory circuit 76 to said level reject comparator 80, the reject lamp 84, a small red indicator light, is lit. At this same instant, a feedback signal from said level reject comparator 80 is fed to gate 82, another conventional electronic switching arrangement. This feedback signal closes gate 82 so that the minimum signal voltage which appears at the level reject comparator 80 may be fed to reject memory circuit 76. This signal voltage is then fed from said reject memory circuit 76 to readout 78 and to the level reject comparator 80. At this point in time the readout 78 has showing thereon the bottle wall thickness in mils. This particular thickness shown on readout 78 is the first bottle wall thickness detected in the scan which is below the bottle wall thickness initially set on said initial reject set point switch 70. Since the minimum signal voltage which appears at the level reject comparator 80 is now fed to said reject comparator 80 from said memory reject circuit 76, this signal voltage becomes the new reference voltage for said reject comparator 80. As the scan of the bottle continues, if the incoming signal voltage to said level reject comparator 80 falls below the new reference voltage thereon, a feedback signal is again fed to gate 82. Gate 82 then closes and the minimum signal voltage which appears at the level reject comparator 80 is again fed to reject memory circuit 76 which in turn feeds the new signal voltage to said readout 78 and to said level reject comparator 80. The readout 78 now has shown thereon the thinnest bottle wall thickness thus far detected directly in mils. The minimum signal voltage which appears at the level reject comparator 80 the second time is now fed from said reject memory circuit 76 to said reject comparator 80, and hence, becomes the reject comparator's new reference voltage.

The above described process for the reject memory circuit 76 and the level reject comparator 80 of comparing, holding, and giving a readout is repeated throughout the scanning cycle whenever the incoming signal voltage to said level reject comparator 80 drops below said reject comparator's reference voltage. Consequently, since said incoming signal voltage becomes the new reference voltage for said level reject comparator and also the voltage which is fed to the readout 78, the final reading on the readout 78 after the entire bottle has been scanned is the smallest wall thickness of bottle wall 52.

The reject lamp 84 lights the first time that the incoming signal voltage to the level reject comparator 80 drops below its initial reference voltage and stays lit until the next scanning cycle is initiated. This is true whether or not said level reject comparator is again triggered by a lower incoming signal voltage. The level reject comparator 80 constitutes the means responsive to said linear, directly proportional, expanded signal voltage from said inverting span amplifier 68 for triggering a reject indicator means, reject lamp 84, when said signal voltage reaches a predetermined point. The reject memory circuit 76 and said readout 78 constitutes the means responsive to said signal voltage for giving a direct readout of the measurement of the article wall thickness.

The initial warning set point switch 88, a thumb switch, like the initial reject set point switch 70, is set directly in terms of mils. Each mil set on said warning set point switch 88 is represented by 10 millivolts. Said initial warning set point switch 88 can be set with a range of 0–9 mils. The voltage which represents the mils set on said warning set point switch 88 is fed to warning level comparator 86. However, the internal wiring of said initial warning set point switch 88 is such that the voltage representing the setting on said warning set point switch 88 is not just this voltage. It is the summation of the voltage representing the mils set on said initial reject set point switch 70 which is fed to switch 88 and the voltage representing the mils set on said initial warning set point switch 88. This summation of voltages therefore becomes the reference voltage for said warning level comparator, another conventional electronic voltage comparator.

Since the incoming signal voltage from said inverting span amplifier 68 is not only fed to said level reject comparator 80 and said gate 82, but is also fed to said warning level comparator 86, said warning level comparator will be triggered by said incoming signal voltage before said incoming signal voltage triggers said level reject comparator 80. This is true whenever said warning set point switch is set to 1 mil or greater since the 1 mil or greater would be represented by a corresponding voltage which because of the summation principle would necessarily be higher than the reference voltage on said level reject comparator 80. The warning level comparator 86 is triggered by the incoming signal voltage whenever said incoming signal voltage drops below the comparator's reference voltage. When the warning level comparator 86 is triggered, it lights warning lamp 90, a yellow indicator light.

The warning level comparator 86 is triggered, only once during a scan of bottle wall 52. This triggering occurs when the incoming signal voltage drops below said warning level comparator's reference voltage from said initial warning set point switch 88. Said warning lamp 90 stays lit until the next scanning cycle is started. Although no readout is associated with the warning level comparator 86, it can serve a useful purpose as an indicator that the bottle wall thickness is approaching the point below which it is too thin and will have to be rejected. If bottles in a production line are being checked and the warning lamp 90 is activated, there may be sufficient time to make corrections at the hot end of the glassware line in order to correct the error which is causing such thinning of the bottle wall 52. This is true since it may take an hour or two from the time a correction initially needs to be made, when said warning lamp 90 is activated, until the wall thickness would have deteriorated to such a point that the level reject comparator 80 would have to be triggered and a reject lamp 84 activated thus indicating the necessity for scrapping the glassware. Of course, the time between activation of the warning lamp 90 and the reject lamp 84 depends upon the thickness in mils set on said warning set point switch 88 and consequently fed into said warning level comparator 86.

Vertical position potentiometer 92, a conventional variable multiturn potentiometer, is mechanically linked to said radiation source 28 and said radiation responsive means which comprises scintillation crystal 24 and photomultiplier tube 26 by gear 93 whose teeth mesh with chain 42. Said vertical position potentiometer 92 is set at a high voltage level at the beginning of the scanning cycle and decreases to a low voltage level at the end of the scanning cycle. As the bottle wall 52 is being scanned from top to bottom, the scan voltage from said vertical position potentiometer 92 is continuously fed to vertical position comparator 94. Said vertical position comparator 94, like level reject comparator 80 and warning level comparator 86, is a conventional electronic voltage comparator. The varying voltage from said vertical position potentiometer 92 is also fed to gate 96, another simple electronic switching arrangement like gate 82 and gate 74. The voltage from said vertical position potentiometer 92 cannot pass through the gate 96 until said gate is closed. This gate 96 is instantaneously closed when start cycle switch 72 is pushed to start the scanning cycle. Hence, this allows the instantaneous voltage on vertical position potentiometer 92 to pass through closed gate 96 into the vertical position memory circuit 98. Said vertical position memory circuit 98, like reject memory circuit 76, is a conventional holding circuit for holding a voltage at its output until said vertical position memory circuit is triggered to change state at which time a new voltage is held at its output. The instantaneous vertical position potentiometer voltage is fed through said vertical position memory circuit 98 to the vertical position comparator 94. The voltage from said vertical position memory circuit 98 to said vertical position comparator 94 is the reference voltage for said comparator 94. The gate 96 opens after initiation of the scanning cycle and the voltage from the vertical position potentiometer 92 is no longer fed to the vertical position memory circuit 98.

As long as gate 96 remains open, the voltage held by the vertical position memory circuit 98 is the instantaneous voltage fed thereto from the vertical position potentiometer 92 at the start of the scanning cycle. However, if an incoming signal voltage to the level reject comparator 80 is below said level reject comparator's reference voltage level, said level reject comparator not only sends a feedback signal to gate 82, but also to gate 96. This feedback signal instantaneously closes gate 96 to allow the decreased voltage from vertical position potentiometer 92 to be fed to vertical position memory circuit 98. This causes said vertical position memory circuit 98 to change state and therefore hold the decreased voltage as its new output reference voltage which is fed to vertical position comparator 94. A feedback signal is sent from level reject comparator 80 to gate 96 whenever the incoming signal voltage to the level reject comparator drops below the level reject comparator's reference voltage. This is repeated throughout the scanning cycle whenever a smaller wall thickness is detected in bottle wall 52. Therefore, the output voltage on the vertical position memory circuit 98 is the voltage representing the vertical position on bottle wall 52 at which the thinnest bottle wall thickness is located.

After the apparatus reaches the end of its scanning cycle at the bottom of bottle 10, motor 46 reverses its direction to return said radiation source 28 and said radiation-responsive means comprising scintillation crystal 24 and photomultiplier tube 26 to its original position before the scanning cycle started. As said radiation source and said radiation responsive means are returning to their original position, the voltage output from the vertical position potentiometer 92 increases. The vertical position comparator 94 is triggered whenever the incoming voltage from the vertical position potentiometer 92 becomes higher than the reference voltage from the vertical position memory circuit 98. When the vertical position comparator 94 is triggered, it sends a signal to motor control circuit 102 to stop motor 46. Motor control circuit 102 comprises a conventional relay control circuit for stopping and starting a motor. The position at which the apparatus and more specifically the radiation source 28 and said radiation responsive means stops is the vertical position of the thinnest glass wall thickness. By pushing a reset button which may be a switch to short circuit the motor control circuit 102, the motor 46 is again activated and returns the radiation source 28 and said radiation-responsive means to its original position for starting a new scanning cycle.

A conventional XY-plotter 104 may be used to plot the wall thickness versus the vertical position for a bottle being measured. Said XY-plotter 104 utilizes the signal voltage from said inverting span amplifier 68 to plot the wall thickness on the Y-axis of said plotter and the vertical position scan voltage from said vertical position potentiometer 92 to plot the vertical position on the X-axis of said plotter. Said XY-plotter may also be used to plot the wall thickness versus the vertical position for a series of bottles being measured. Such a plot for a series of bottles can indicate a trend in the wall thickness of said bottles. This information may then be used to make corrections at the hot end of the glassware line to prevent the rejecting and scrapping of large quantities of glassware. Also, a plot of the wall thickness versus the vertical position for a series of bottles can indicate the glass distribution in the bottles. This information is useful in getting new glass bottle molds set up and into production.

What is claimed is:

1. In an apparatus for checking the wall thickness of a hollow article having at least one opening, comprising: a means for rotating said hollow article so that its wall structure can be completely scanned, a radioactive radiation source, a radiation-responsive means spaced from said radiation source, said radiation source being within the hollow article and said radiation-responsive means being outside the hollow article so that the wall of the hollow article is between the radiation source and the radiation-responsive means, variations in the wall thickness of said hollow article cause variations in the level of radiation being received by the radiation-responsive means, a means for moving said radiation source and said radiation-responsive means relative to the hollow article to scan its wall structure, said radiation-responsive means producing a varying energy voltage pulse output with the number of pulses being dependent upon the level of radiation received from said radiation source, then a voltage pulse generator means for standardizing said varying energy voltage pulses to a constant energy level, then an integrator means for converting said voltage pulses from said pulse generator means into an analog voltage signal which is inversely logarithmically related to said article wall thickness being checked, wherein the improvement comprises a logarithmic detecting means for converting said analog voltage into a voltage which is inversely linearly related to said article wall thickness, an inverting span amplifier means both inverting said linear voltage into a voltage directly proportional to said article wall thickness and expanding said voltage to a predetermined voltage per unit of article wall thickness, a means responsive to said linear, directly proportional, expanded signal voltage for triggering a reject indicator means when said signal voltage reaches a predetermined point, and a means responsive to said signal voltage for giving a direct readout of the measurement of said article wall thickness.

2. In the apparatus of claim 1 wherein the improvement includes a means responsive to said signal voltage for triggering a warning means at a predetermined level prior to the triggering of said reject indicator means.

3. In the apparatus of claim 2 wherein the improvement includes a means for indicating the vertical position of the point of smallest wall thickness of said hollow article at that point where said signal voltage deviates the greatest beyond the aforesaid predetermined point.

4. In the apparatus of claim 3 wherein the improvement includes a means responsive to said signal voltage and the vertical position scan voltage for plotting the wall thickness versus the vertical position for a hollow article being checked.